United States Patent Office 2,833,745
Patented May 6, 1958

2,833,745

PRODUCTION OF THE SALTS OF POLYMERIZED ALPHA.BETA-UNSATURATED ALIPHATIC ACIDS

Hans Fikentscher, Ludwigshafen (Rhine), Germany, assignor to Badische Anilin- & Soda-Fabrik Aktiengesellschaft, Ludwigshafen (Rhine), Germany No Drawing. Application June 15, 1954
Serial No. 436,995

Claims priority, application Germany June 24, 1953

7 Claims. (Cl. 260—80)

This invention relates to the production of alkali or ammonium salts of polymerized alpha.beta-unsaturated aliphatic monocarboxylic acids with 3 to 4 carbon atoms in solid form.

This invention more particularly relates to solid masses which can be readily comminuted and which are made from alkali or ammonium salts of polymerized alpha.beta-unsaturated aliphatic monocarboxylic acids with 3 to 4 carbon atoms.

For the production of salts of polymerized alpha.beta-unsaturated aliphatic monocarboxylic acids, such as polyacrylic acid and its homologues and analogues, it is possible to start for example from polyacrylic acid which is converted into the corresponding salts by kneading with aqueous alkaline solutions, or to start from saponifiable derivatives, for example polyacrylonitrile or polyacrylic acid esters, which are converted into the salts of polyacrylic acid by saponification with alkalies or ammonia. The salts of polymeric acrylic acid and its homologues can also be obtained directly by polymerizing aqueous solutions, rendered slightly acid, of alkali or ammonium salts of the monomeric unsaturated carboxylic acids (see German patent specification No. 695,097). This latter method has been specially approved industrially and leads to waterclear, highly viscous aqueous pastes or solutions.

For many purposes it has been found to be necessary to prepare the solid salts of polyacrylic acid and its homologues from these solutions by drying. Apart from the technical difficulties in removing water from a highly viscous aqueous paste or solution by suitable drying apparatus, the separate carrying out of the polymerization in aqueous solution and the subsequent drying occasions a considerable increase in the cost of the end product.

I have now found that alkali or ammonium salts of polymerized alpha.beta-unsaturated aliphatic monocarboxylic acids with 3 to 4 carbon atoms, for example polyacrylic acid, its homologues and analogues can be prepared directly in a solid form in a very simple manner by mixing acrylic acid or its homologues or analogues with alkali or ammonium carbonates, bicarbonates or carbaminates and then carrying out the polymerization by the addition of appropriate accelerators in a completely anhydrous medium or in the presence of only such a small amount of water that the polymer formed can still be readily comminuted. There are thus obtained masses which, when cold, are solid and porous and which can be readily comminuted to powder.

Instead of acrylic acid there may equally well be used its homologues, as for example methacrylic acid, or also analogous unsaturated acids, such as, for example, the halogenacrylic acids or alkoxy-substituted acrylic acids.

As suitable carbonates or bicarbonates there may be mentioned ammonium carbonate, ammonium bicarbonate, sodium or potassium carbonate and the corresponding bicarbonates. Instead of the carbonates there may also be used salts of carbamic acid, as for example the ammonium salt of carbamic acid.

In order to prepare the mixtures of these carbonates with the acrylic acid or its homologues or analogues, it is preferable to place the carbonates in a vessel and to allow the unsaturated acids to flow in rapidly while stirring or otherwise effecting movement.

In the case of ammonium carbonate or bicarbonate it is preferable to bring the acrylic acid or its homologues or analogues to reaction with the carbonates or bicarbonates in approximately equivalent proportions. With the carbonates or bicarbonates of sodium or potassium, however, it is preferable to use an excess of the free unsaturated acid because the polymerization proceeds especially favorably in acid medium and the excess of acid also keeps the reaction melt liquid for a longer period before crystallization occurs so that the accelerator can be introduced readily. The excess of monomeric acid is preferably of the order of about 10 to 50 percent.

Depending on the carbonate used, heat may be evolved or absorbed. Upon mixing, a vigorous evolution of carbon dioxide occurs. It can be preferable to add to the mixture of unsaturated acid and carbonate water up to a maximum of 50 percent with reference to the unsaturated acid. In this way the troublesome crystallization of the monomeric salt from the melt is retarded and the polymerization reaction moderated. The amount of water added must only be such that the final product remains readily pulverizable.

The known accelerators may be used, such as, for example, hydrogen peroxide, persulfates, organic peroxides and hydroperoxides, as well as azo compounds. In order to obtain highly viscous polymers it is preferable to initiate the polymerization at the lowest possible temperature, and this may be effected by increasing the activity of the peroxides in known manner by activators, as for example sulfites, formaldehyde-sulfoxylates, hyposulphites or also amines.

The solubility and viscosity of the polymer salts can be influenced extensively by the use of polymerization regulators. In order to obtain salts of polyacrylic acids, its homologues or analogues of high viscosity, it is preferable to use pure initial materials which in particular are free from even traces of polyvalent heavy metal ions, in particular of copper.

During the polymerization there may also be present for example organic water-soluble substances of the type of urea, the ureides, or inorganic salts, especially salts which are capable of binding water, or also pigments and dyestuffs which can be dispersed more readily and more uniformly in the mixture of the monomers than in the polymeric compounds after the polymerization.

The polymerization proceeds rapidly with the evolution of heat and rise of the temperature to more than 130° C. and evolution of carbon dioxide and in some cases steam and ammonia, in so far as these substances are present in the system. There are thus obtained porous, spongy, loose, solid or brittle products which can readily be pulverized to fine powder by the usual comminution machines.

The process can also be carried out continuously, for example by continuously mixing the mixture of unsaturated acid and the carbonate, with or without additions of other accompanying substances, with the accelerators, applying it to a movable support, allowing it to polymerize on this support and removing the reaction product continuously from the support.

The reaction product can be worked up in water and aqueous media to form highly viscous solutions or highly viscous jellies, and can be used industrially as usual as thickening and binding agents, as finishing agents, sizing agents, adhesives, for pharmaceutical and cosmetic purposes and as soil improving agents.

The following examples will further illustrate this invention but the invention is not restricted to these examples. The parts are parts by weight.

Example 1

144 parts of anhydrous acrylic acid are allowed to flow while stirring into an open vessel containing 78 parts of ammonium carbonate. The ammonium carbonate dissolves in the acrylic acid with evolution of carbon dioxide and cooling to 0° C. to −2° C. After heating as rapidly as possible to 10° C., 0.7 part of potassium persulfate and 0.035 part of sodium formaldehyde sulfoxylate dissolved in a little water are uniformly stirred into the mixture. In a short time the polymerization commences, the temperature rises to about 130° C. and a strong evolution of carbon dioxide, steam and ammonia gas occurs.

About 160 parts of a porous loose mass are obtained which can be readily broken up and ground to powder.

The product can be used as powder in known manner, in particular as a soil improving agent for heavy clay soils.

Example 2

54 parts of anhydrous sodium carbonate are intimately mixed with 144 parts of anhydrous acrylic acid and 60 parts of water and into the resulting mixture, while evolution of carbon dioxide is still occurring, there are uniformly dispersed 1.4 parts of potassium persulfate and 0.076 part of sodium formaldehyde sulfoxylate. The temperature rises rapidly from about 25° C. to 130° C. to 140° C. and a strong evolution of carbon dioxide and steam occurs. A spongy porous product is obtained which, after cooling, can readily be ground to a fine powder.

Example 3

53 parts of anhydrous sodium carbonate are intimately mixed with 144 parts of acrylic acid and 40 parts of water and there are then added 0.7 part of potassium persulfate and 0.035 part of sodium formaldehyde sulfoxylate. The temperature rises to 25° C. with strong evolution of carbon dioxide and then rises, by the polymerization, to 120° C. to 130° C., carbon dioxide and steam escaping.

175 parts of a frothy porous mass are obtained which can readily be pulverized after cooling. By dissolving it in water, a highly viscous solution having a pH value of 5.4 is obtained.

Example 4

144 parts of acrylic acid and 40 parts of water are added to 69 parts of potassium carbonate, whereby the temperature rises to above 50° C. with simultaneous evolution of carbon dioxide. Immediately after the dissolution of the potassium carbonate, 0.7 part of potassium persulfate and 0.035 part of sodium formaldehyde sulfoxylate are added as catalyst. The polymerization sets in immediately and 180 parts of a frothy porous mass are obtained with strong evolution of carbon dioxide and steam. The product dissolves in water to give a highly viscous solution having a pH value of 5.7.

I claim:

1. A process of manufacturing a solid salt of a polyacrylic acid which comprises mixing a monomeric acrylic acid with a compound selected from the group consisting of ammonium and alkali metal carbonates, bicarbonates and carbaminates, the mixture of the monomeric acrylic acid and of said compound containing at most 50% of water with reference to the monomeric acrylic acid and the monomeric acrylic acid being neutralized to at least 50% by said compound, and polymerizing the mixture in the presence of a polymerization accelerator with the evolution in the reaction mixture of at least one gas from the group consisting of carbon dioxide and ammonia in order to produce a solid salt of a polyacrylic acid which can be comminuted to a powder.

2. A process as claimed in claim 1 wherein said monomeric acrylic acid is mixed with said compound in an anhydrous medium and the polymerization is carried out in an anhydrous medium.

3. A process as claimed in claim 1 wherein said monomeric acrylic acid and said compound are mixed in about equivalent amounts.

4. A process of manufacturing a solid sodium salt of a polyacrylic acid which comprises mixing a monomeric acrylic acid with sodium carbonate, the mixture of the monomeric acid and of the sodium carbonate containing at most 50% of water with reference to the unsaturated acid and the acrylic acid being neutralized to at least 50% by the sodium carbonate, and polymerizing said mixture in the presence of a polymerization accelerator with the evolution in the reaction mixture of carbon dioxide gas in order to produce a solid salt of a polyacrylic acid which can be comminuted to a powder.

5. A process of manufacturing a solid potassium salt of a polyacrylic acid which comprises mixing a monomeric acrylic acid with potassium carbonate, the mixture of the monomeric acid and of the potassium carbonate containing at most 50% of water with reference to the unsaturated acid and the acrylic acid being neutralized to at least 50% by the potassium carbonate, and polymerizing said mixture in the presence of a polymerization accelerator with the evolution in the reaction mixture of carbon dioxide gas in order to produce a solid salt of a polyacrylic acid which can be comminuted to a powder.

6. A process of manufacturing a solid ammonium salt of a polyacrylic acid which comprises mixing a monomeric acrylic acid with ammonium carbonate, the mixture of the monomeric acid and of the ammonium carbonate containing at most 50% of water with reference to the unsaturated acid and the acrylic acid being neutralized to at least 50% by the ammonium carbonate, and polymerizing said mixture in the presence of a polymerization accelerator with the evolution in the reaction mixture of carbon dioxide and ammonia gases in order to produce a solid salt of a polyacrylic acid which can be comminuted to a powder.

7. A process for manufacturing a solid salt of a polyacrylic acid which comprises mixing a monomeric acrylic acid with an alkaline compound which is decomposable in the mixture into carbon dioxide gas, said mixture containing at the most 50% by weight of water with reference to the monomeric acrylic acid, and the alkaline compound being present in an equivalent amount equal to at least about 50% of the equivalent amount of monomeric acrylic acid; and polymerizing the resulting monomeric polyacrylic compound, with strong evolution of carbon dioxide gas derived by decomposition of said alkaline compound during polymerization reaction, to produce a solid, porous polyacrylic salt which can be comminuted directly into a powder.

References Cited in the file of this patent

UNITED STATES PATENTS

| 2,205,883 | Graves | June 25, 1940 |
| 2,546,244 | Tucker | Mar. 27, 1951 |

FOREIGN PATENTS

| 500,475 | Great Britain | Feb. 6, 1939 |
| 695,097 | Germany | Aug. 16, 1940 |

OTHER REFERENCES

Beilstein's Handbuch der Organischen Chemie, auf., Band II, p. 399 (Berlin, 1920).

Schildknecht: Vinyl and Related Polymers, p. 304 (1st ed.).